Oct. 9, 1934.  F. MARTI  1,976,181
JEWEL BEARING FOR WATCHES AND THE LIKE
Filed Feb. 13, 1933
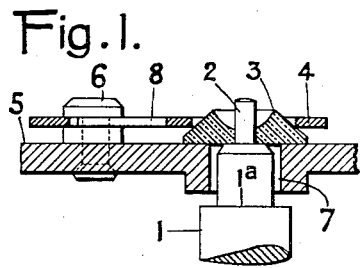
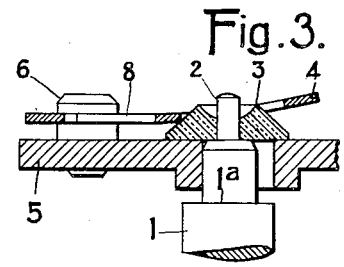
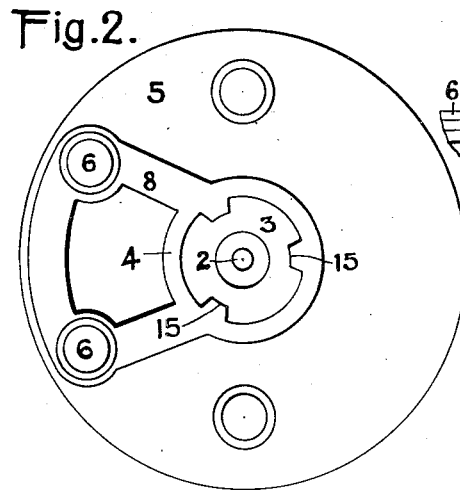
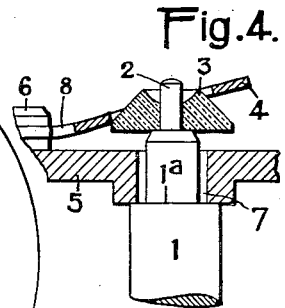
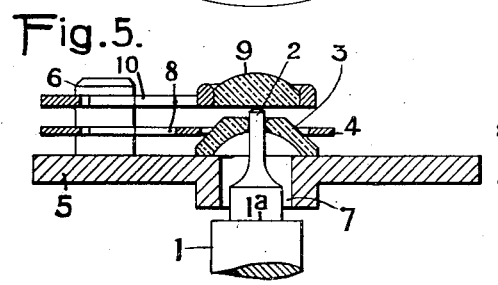
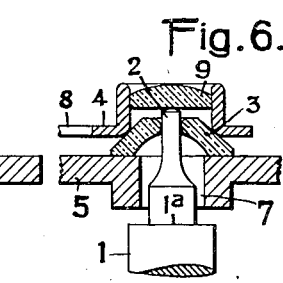
Inventor:
Fritz Marti Patented Oct. 9, 1934

1,976,181

UNITED STATES PATENT OFFICE 1,976,181

JEWEL BEARING FOR WATCHES AND THE LIKE

Fritz Marti, La Chaux-de-Fonds, Switzerland

Application February 13, 1933, Serial No. 656,579
In Germany February 13, 1932

1 Claim. (Cl. 58—140)

The invention relates to an elastic jewel bearing for the shafts of watches and the like, in which a spring tension plate cooperates with a radially and axially movable pierced jewel member for the pivot of the shaft in order to seat and center said supporting member and to thus avoid breaking of the pivot. Different constructions of this kind are known. In one construction, for example, the spring tension plate acts on a case containing the pierced jewel member as well as the cap jewel member, to center bodily said case with its inner parts. Contrarily to this, in the present invention, the centering of the bearing through said spring tension plate is obtained solely and immediately by its action on a smooth conical outer surface of the pierced jewel member itself.

In such cases where also an axially yieldable cap jewel member is used, it will be only the pierced jewel member which will be allowed to follow the radial deflections of the shaft. By this arrangement, the mass to be centered and also the height of the bearing will be considerably reduced. Owing to this reduction of the mass to be centered and also by reason of the smoothness of the supporting jewel member, there will be obtained a great sensibility with respect to the centering effect.

The accompanying drawing shows several embodiments of the present invention.

Fig. 1 is a sectional view and

Fig. 2 is a plan view of one form of the improved bearing;

Fig. 3 is a similar sectional view thereof, but showing the bearing overloaded in radial direction;

Fig. 4 is a similar view in the case of an axial overloading;

Fig. 5 is a sectional view of a bearing having both a pierced jewel member and a cap jewel member;

Fig. 6 shows by a similar view another construction of this last type.

Referring first to Figures 1 to 4 of the drawing, 1 represents the shaft to be supported by means of its pivot 2.

The pivot 2 engages the pierced jewel member 3 having a smooth conical outer surface and being pressed in known manner with its base upon the plate 5 by the action of a spring tension plate 8 having an annular part 4 bearing on said conical surface of the pierced jewel member 3. The spring tension plate 8 is fastened at its rear end on the plate 5, for example by means of two rivets 6. The opening 7 in the plate 5 is of such a width that the shaft passing therethrough has some free play in the opening. The shaft 1 has a shoulder 1ª situated below the plate 5 so as to limit also the displacement of the shaft in the axial direction.

The operation of the device is obvious. When a radial overloading of the shaft takes place transversely to the axis thereof from right hand to left hand as seen in Figure 3, the jewel member 3 yields laterally, the annular part 4 of the spring tension plate 8 sliding up on the smooth conical surface of the jewel member 3 and being therefore compelled to yield in the axial direction, whilst the tension of the spring plate is correspondingly increased. Such radial displacement of the jewel member 3 is limited by the play between the wall of the opening 7 and the shaft 1. As the shaft 1 is sufficiently strong at this point to sustain the momentary overloading, the pivot 2 itself will be discharged from any undue strains, so that it is protected against breaking.

As soon as the overload disappears, the tensioned spring plate 8 returns the jewel member 3 by its pressure on the smooth conical surface thereof to its centered position.

If the shaft should be subjected to an axial overload, the pierced jewel member 3 yields together with the annular part 4 of the spring plate 8, as shown in Figure 4, until the shoulder 1ª of the shaft 1 comes into contact with the plate 5.

In the construction of Figure 5, the pierced jewel member 3 of hollow form acted upon by the annular part 4 of the spring tension plate 8 is combined with a cap jewel member 9 which can yield axially, but not radially, being located in a seating of a second spring plate 10.

According to Figure 6, the seating for the cap jewel member 9 is integral with the annular part 4 of the same spring plate 8 that acts upon the conical pierced jewel member 3.

What I claim is:—

A jewel bearing for watches and the like, comprising a plate, a radially and axially movable pierced jewel for receiving the shaft pivot, freely seated on said plate and having a smooth conical outer surface, and a seating and centering leaf spring having an annular part bearing on the conical outer surface of said jewel to yieldingly apply same onto the plate while allowing axial and radial displacement thereof.

FRITZ MARTI.